United States Patent [19]

Ott

[11] Patent Number: 4,764,567
[45] Date of Patent: Aug. 16, 1988

[54] PROCESS FOR THE PREPARATION OF POLYOXYALKYLENE BLOCK POLYETHERS HAVING ENHANCED PROPERTIES

[75] Inventor: Roger A. Ott, Wachenheim, Fed. Rep. of Germany

[73] Assignee: BASF Corporation, Parsippany, N.J.

[21] Appl. No.: 932,575

[22] Filed: Nov. 20, 1986

[51] Int. Cl.$^4$ .................................................. C08L 71/02
[52] U.S. Cl. ........................................ 525/403; 525/409; 528/409; 528/417; 528/421; 568/613
[58] Field of Search ................ 525/403, 409; 528/417, 528/421, 409; 568/620, 613; 252/351

[56] References Cited

U.S. PATENT DOCUMENTS 3,393,243 7/1968 Cuscurida .......................... 568/620

Primary Examiner—Theodore E. Pertilla
Attorney, Agent, or Firm—William G. Conger

[57] ABSTRACT

Polyoxyalkylene block polyether polyols having enhanced physical properties are prepared by catalyzing the ethylene oxide addition with cesium hydroxide or mixtures of cesium hydroxide with other basic catalysts. These polyethers are especially useful in surface active applications.

19 Claims, 1 Drawing Sheet

PROCESS FOR THE PREPARATION OF POLYOXYALKYLENE BLOCK POLYETHERS HAVING ENHANCED PROPERTIES

BACKGROUND OF THE INVENTION

1. Field of the Invention

The subject invention relates to a process for the preparation of polyoxyalkylene block polyethers. More particularly, the invention relates to a process for the preparation of block polyoxyalkylene polyethers having one or more polyoxyethylene blocks and at least one block derived from a higher alkylene oxide. The use of cesium hydroxide to catalyze the oxyethylation results in polyethers having enhanced properties.

2. Description of the Related Art

Polyoxyalkylene block polyethers are well known commercial products having many uses, the most important of which is their use as nonionic surfactants. Polyoxyalkylene block polyether surfactants generally have both hydrophobic and hydrophilic blocks, and are described, for example, by Lundsted in U.S. Pat. No. 2,674,619 and by Jackson and Lundsted in U.S. Pat. Nos. 2,677,700 and 3,036,118. These references also disclose the preparation of such polyoxyalkylene block polyethers by oxypropylating an initiator molecule possessing two or more active hydrogens in the presence of a basic catalyst such as sodium or potassium hydroxide. The polyoxypropylene hydrophobe is then oxyethylated to produce external hydrophiles, or, in certain cases, the oxypropylation and oxyethylation may be reversed to produce "reverse" non-ionic surfactants having an internal hydrophile and external hydrophobes.

Diblock polyoxyalkylene polyethers or triblock polyoxyalkylene polyethers capped on one end are also useful products. These products are generally prepared by sequentially oxyalkylating a monofunctional initiator molecule such as an alkanol or phenol. To prepare diblock polyethers by this method, the initiator is first reacted with a higher alkylene oxide, that is, one having three or more carbons. The resulting hydrophobe is then oxyethylated. In certain applications the oxyalkylation may be reversed. Triblock polyethers are similarly prepared, but with a third oxyalkylation utilizing the same alkylene oxide as used for the first oxyalkylation.

For example, a triblock polyoxyalkylene polyether may be conventionally prepared, as shown in the reaction scheme below, by first oxypropylating a difunctional initiator molecule followed by oxyethylation. In these reaction schemes, —OP— and —PO— represent oxypropyl residues derived from propylene oxide while —OE— and —EO— represent analogously derived oxyethyl groups.

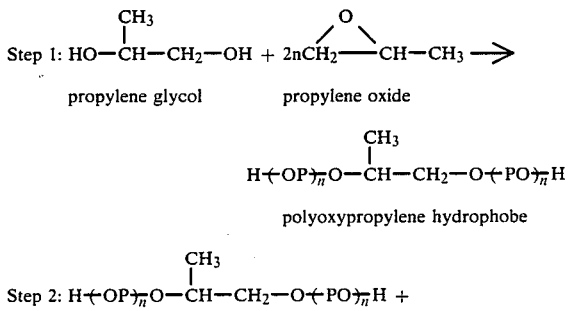

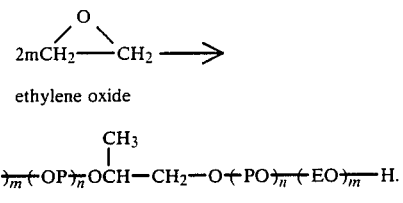

An analogous monofunctional, mono-capped triblock polymer may be prepared by starting with a monol, R—OH, such as methanol, butanol, or benzylalcohol and altering the oxyalkylation sequency as follows:

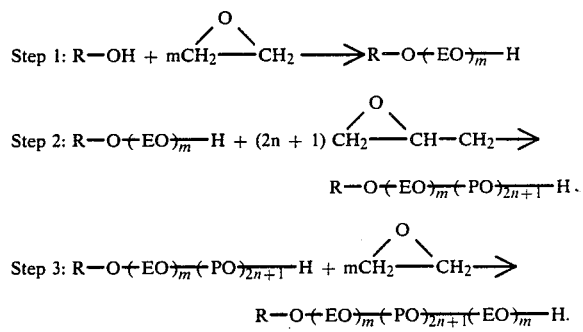

Such mono-capped block polyethers where the cap is joined to the block polyether by an ether linkage are hydrolytically stable and have been shown to possess different physical and chemical properties as compared to their non-capped analogues including modified surface activity and increased thermal stability.

The polyoxyalkylene polyethers described above have proven useful in numerous applications, particularly those requiring surface active properties such as detergents, foaming and defoaming agents, emulsifying and dispersing agents, and as thickeners in aqueous systems. However, despite their great utility, the methods of preparation previously described never results in a single, uniform product molecule, but in a cogeneric mixture containing molecules with widely varying total molecular weights as well as widely varying hydrophobe and hydrophile weights. This is particularly true as the molecular weights increase. Although it is well known that block polyether surfactants having uniform, narrow molecular weights and compositions possess properties markedly different from those of ordinary commercial products, it has been impossible to prepare such specialty products without inordinate expense.

It has now been surprisingly discovered that polyoxyalkylene block polyethers having narrow molecular weight distribution, uniform composition, and unexpectedly low levels of unsaturation may be simply and economically prepared through the use of cesium hydroxide catalysis for at least the oxyethylation portion of the polyether synthesis, and preferably for both oxyethylation and oxypropylation.

The use of cesium hydroxide as a polyoxypropylation catalyst has been proposed in U.S. Pat. No. 3,393,243. According to this reference, the use of cesium hydroxide as opposed to conventional sodium or potassium hydroxide catalysts in the synthesis of polyoxypropylene glycols prevents the elimination reaction at the polyether chain terminus, which ordinarily results in forming allylic unsaturation and, at the same time, lowers and broadens the molecular weight of the product polyoxypropylene glycols.

A mechanism for the elimination disclosed in U.S. Pat. No. 3,393,243 is discussed in *Ceresa, Block and Graft Copolymerization*, vol. 2, published by Wiley-Interscience at page 18. The mechanism apparently involves hydrogen abstraction via a specific cyclic transition state which may be represented as follows:

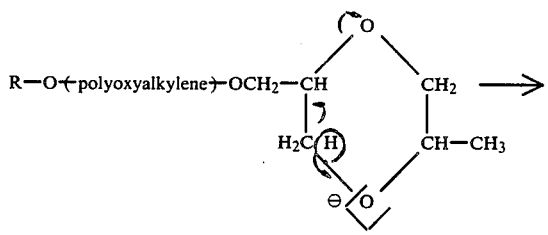

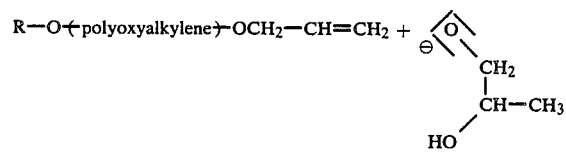

The unsaturation formed increases as a direct function of equivalent weight. Eventually a point is reached wherein further propylene oxide addition fails to increase the molecular weight.

When oxyethylation rather than oxypropylation is performed, as in the preparation of block polyethers, the use of cesium hydroxide as a catalyst has not been contemplated. The reason for this is that while it is readily conceived that polyoxypropylene glycols may react by the above mechanism, the same cannot be true for polyoxyethylene glycols or for oxyethylated polyoxypropylene glycols containing more than one oxyethyl group. Thus, until now, such block polyethers have been prepared with less expensive sodium and potassium hydroxide catalysts.

For example, when a *single* oxyethyl group is added to a polyoxypropylene glycol, the elimination mechanism may be written thusly:

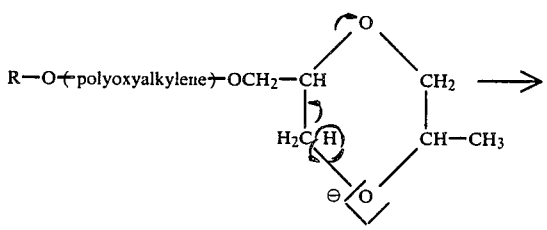

-continued

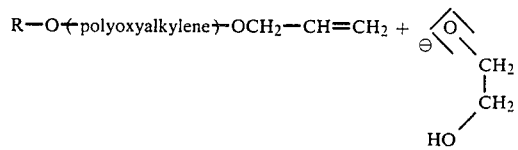

However, when more than one oxyethyl group is present, the requisite transition state cannot be achieved, and thus it had not been thought that the elimination products could affect in the polymerization reaction:

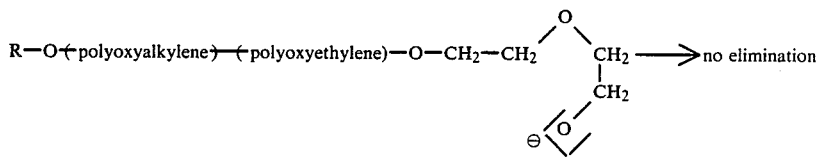

Consequently, no elimination, no unsaturation formation, and therefore no lowering of the polyether molecular weight is expected during ethylene oxide addition and, in fact, none has been detected heretofore.

SUMMARY OF THE INVENTION

It has now been surprisingly discovered, contrary to previous belief, that unsaturation is produced not only during the preparation of polyoxypropylene glycols during oxypropylation of a suitable initiator, but is also formed during oxyethylation as well. There is at present no accepted mechanism which to attribute this formation of unsaturation during ethylene oxide addition. It has further been discovered that cesium hydroxide is effective in lowering the amount of unsaturation formed during ethylene oxide addition and, at the same time, producing block polyethers with narrow molecular weight distribution and uniform composition.

DESCRIPTION OF THE PREFERRED EMBODIMENTS

Figure 1:
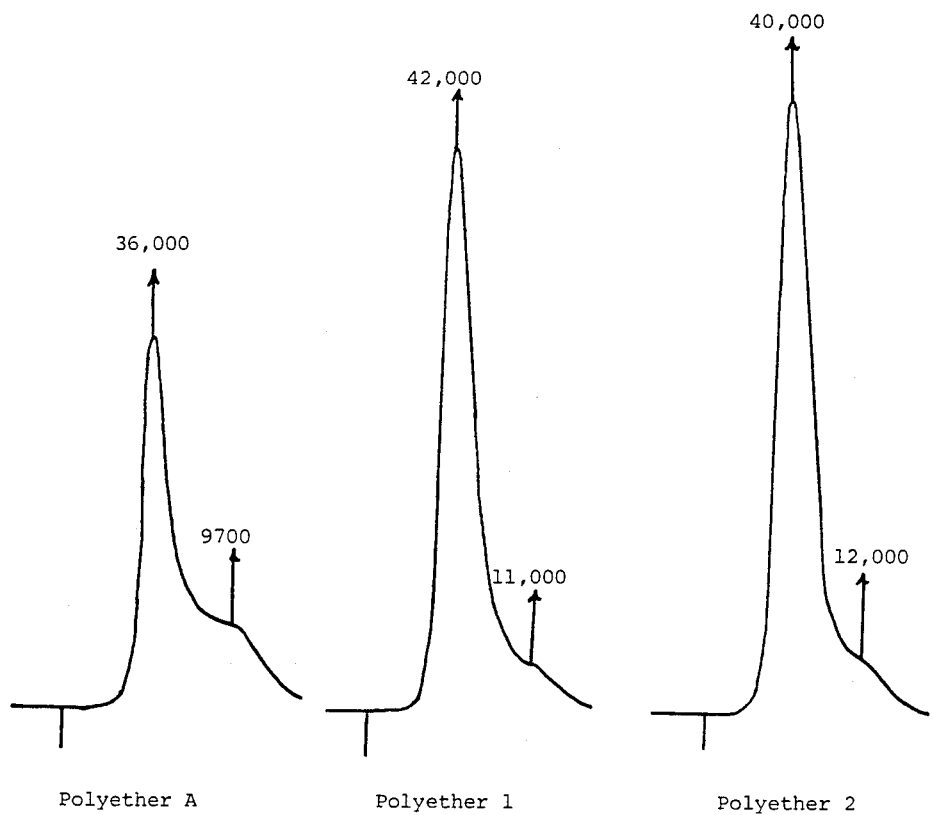
FIG. 1, illustrates the narrower molecular weight distribution and higher overall molecular weight, as measured by gel permeation chromatography, of copolymer polyethers prepared in accordance with the process of the subject invention.

The polyoxyalkylene block polyethers of the subject invention are prepared in the conventional manner, except that cesium hydroxide is utilized as the oxyalkylation catalyst rather than the conventional potassium hydroxide or sodium hydroxide catalysts. Other, strongly basic cesium salts, for example cesium methoxide, or other basic, cesium containing compound, for example cesium oxide, cesium carbonate, cesium acetate and other cesium alkoxides such as the alkoxides of $C_2$-$C_8$ lower alkanols may also be utilized. Preferably the catalyst contains, in addition to cesium hydroxide, no more than 50 mole percent of other alkali metal hydroxides and more preferrably, no more than 20 mole percent. Most preferably, pure or technical grade cesium hydroxide alone is utilized.

When the polyoxypropylene or higher alkylene oxide-derived hydrophobe is prepared first by oxyalkyklating a mono-, di-, or higher functional initiator such as methanol, butanol, ethylene glycol, propylene glycol, butylene glycol, glycerine, tetrakis (2-hydroxypropyl)-ethylenediamine or the like, potassium hydroxide may be used as the initial oxyalkylation catalyst provided that the hydrophobe is of modest molecular weight, i.e., equivalent weights of less than 2000, preferably less than 1500. However, in this case, the residual potassium hydroxide catalyst is preferably removed prior to additional oxypropylation to higher molecular weights, and, in any case, before oxyethylation. The mechanics of polyether preparation are otherwise conventional and well known to those skilled in the art. Examples of such preparation may be found, for example, in the treatise by Schick entitled *Nonionic Surfactants*, and in U.S. Pat. Nos. 2,674,619, 2,677,700, and 3,036,188 which are herein incorporated by reference.

The amount of cesium hydroxide catalyst utilized is the same as that utilized when sodium hydroxide or potassium hydroxide is the catalyst, on a mole-to-mole basis. Generally, from 0.005 percent to about 5 percent, preferably 0.005 percent to 2.0 percent, and most preferably 0.005 percent to 0.5 percent by weight of catalyst relative to the finished product is utilized. The catalyst composition during oxyethylation should be essentially cesium hydroxide. Up to 75 mole percent of potassium or sodium hydroxide may be tolerated in the cesium hydroxide catalyst, but generally less than 20 mole percent, and preferably less than 10 mole percent relative to total catalyst are preferred. Cesium alkoxides of $C_1$–$C_8$ lower alkanols, particularly cesium methoxide, as well as other highly basic cesium salts may also be used if desired. Thus the catalyst may contain a basic cesium compound and conventional potassium or sodium hydroxide catalysts in mole ratios of greater than 1:3, preferably greater than 1:1, and more preferably greater than about 4:1 or 9:1.

The hydrophobe of the polyoxyalkylene block polyethers of the subject invention are derived from a higher alkylene oxide, or from tetrahydrofuran. By the term "higher alkylene oxide" is meant alkylene oxides having from 3 to about 18 carbon atoms in the alkylene moiety. While the hydrophobe is preferably a polyoxypropylene hydrophobe, other hydrophobes based on higher alkylene oxides such as 1,2-butylene oxide and 2,3-butylene oxide may also be used. Although not preferred, the hydrophobe also may be derived from $C_8$ to $C_{18}$ olefin oxides, or from the polymerization of tetrahydrofuran. The oxyalkylation of a suitable initiator with a higher alkylene oxide results in the synthesis of a polyoxy(higher alkylene) block.

The examples which follow serve to illustrate the process of the subject invention. All polyethers are prepared by conventional techniques with the exception of the particular catalyst utilized. The oxyalkylation is performed in a stainless steel high pressure stirred autoclave. The initial charge, consisting of initiator or intermediate base, and catalyst is vacuum stripped at a temperature of from about 90° C. to 125° C. and a pressure of c.a. 10 torr to remove water. The propylene oxide feed rates are adjusted so as to maintain the reactor pressure at 90 psig or below, including a 45 psig nitrogen pad.

COMPARATIVE EXAMPLE A

Unsaturation Formation During Ethylene Oxide Addition

A block polyether is prepared conventionally as described above. The initiator is tetrakis[2-hydroxypropyl]ethylenediamine which is oxypropylated at a temperature of 100° C. using conventional KOH catalysis at a catalyst concentration of 0.08 percent by weight relative to the final product (post oxyethylation) weight. Following oxypropylation, a portion of the oxypropylated intermediate base is treated with magnesium silicate to remove residual KOH catalyst and analyzed. The c.a. 3900 Dalton molecular weight product has an unsaturation, expressed as mg. of KOH per gram of polyether, of 0.008. The remainder of the intermediate base is reacted at a temperature of 160° C. with sufficient ethylene oxide to produce a polyoxypropylenepolyoxyethylene tetrol having a nominal molecular weight, based on ethylene oxide charged, of 39,500 Daltons. This product is treated with magnesium silicate to remove residual KOH catalyst and analyzed. The product has a measured unsaturation of 0.054 meq KOH/g. A 15 percent by weight aqueous solution has a viscosity at 50° C. of only 18.0 centistokes.

This example illustrates that unsaturation is formed during ethylene oxide addition as well as during propylene oxide addition, a phenomenon not previously considered of importance in block copolymer synthesis. It was expected that unsaturation produced during oxypropylation would be "diluted" during ethylene oxide addition. The finished product, which has a molecular weight approximately ten times higher than the polyoxypropylene polyether intermediate base, would therefore have an unsaturation one-tenth as great, or approximately 0.0008 meq KOH/g. However, instead of this very low, almost insignificant level of unsaturation, the finished product shows an unsaturation of 0.054 meq KOH/g, some seven times higher than the intermediate base, and sixty-seven times higher than expected! The elimination mechanism discussed previously cannot account for the large increase in unsaturation.

The molecular weight distribution of the polyether of Comparative Example A as shown by gel permeation chromatography is shown in FIG. 1 as "polyether A." As indicated, the molecular weight distribution is rather broad, with the major peak centered at a molecular weight of only 36,000 Daltons, considerably below the theoretical molecular weight of 39,500 Daltons. In addition, a large shoulder, representing about 15 percent by weight of the polyether, has a molecular weight of only 9700 Daltons.

EXAMPLE 1

The process of Comparative Example A is followed except that a 1:1 mixture of cesium hydroxide and potassium hydroxide is used throughout the oxyalkylation with both propylene oxide and ethylene oxide. The ethylene oxide addition temperature is 135° C. The hydrophobe has a nominal molecular weight of 3900 Daltons, while the product polyether molecular weight is 39,500 Daltons as in Example A. The product has an aqueous viscosity at 15 percent concentration of 177 centistokes at 50° C. The unsaturation, determined graphically by interpolation from known values, is 0.005 meq KOH/g. The molecular weight distribution, as determined by gel permeation chromatography, is shown in FIG. 1 as "polyether 1." The bulk of the product elutes as a narrow peak centered at 42,000 Daltons. This is a considerably narrower range than that achieved through conventional catalysis as indicated by the chromatograph of Comparative Example A. In addition, the cesium hydroxide catalyzed product has a higher overall molecular weight.

EXAMPLE 2

The process of Example 1 is followed, but cesium hydroxide alone is used for the oxyalkylation. The product gels at 15 percent aqueous concentration. A 12 percent by weight aqueous solution has a viscosity of 57.9 centistokes. The unsaturation is estimated graphically to be 0.004 meq KOH/g. The molecular weight distribution is shown in FIG. 1. A fairly narrow peak at 40,000 Daltons comprises the bulk of the polyether, with only a slight shoulder at 12,000 Daltons, indicating that the cesium hydroxide catalyzed product has both higher overall molecular weight and a narrower molecular weight distribution than conventionally catalyzed products.

EXAMPLE 3

The process of Example 1 is followed, but oxypropylation is stopped after 20 moles of propylene oxide are added. Following removal of residual KOH catalyst by means of magnesium silicate, the c.a. 1700 mw polyoxypropylated product is recatalyzed with an amount of cesium hydroxide chemically equivalent to the amount of KOH originally used. Sufficient additional propylene oxide is added to achieve a nominal hydrophobe molecular weight of 3900 Daltons, following which ethylene oxide is added to achieve a final polyether molecular weight of 39,500 Daltons, as before. The 50° C. aqueous viscosity at 15 percent by weight concentration is 109 centistokes. The product has an estimated unsaturation of 0.006 meq KOH/g determined graphically from the aqueous measured viscosity.

COMPARISON EXAMPLE B

A conventional triblock polyoxyalkylene polyether is prepared by oxypropylating propylene glycol in the presence of KOH as the catalyst until a molecular weight of 3000 Daltons is obtained, following which ethylene oxide is added until the polyoxyethylene-polyoxypropylene-polyoxyethylene polyether has a nominal theoretical molecular weight of 10,000 Daltons calculated from the measured hydroxyl number of 8.9 meq KOH/g. A 20 percent by weight aqueous solution of the solid product produces a gel.

EXAMPLE 4

A triblock polyoxyalkylene polyether is produced exactly as in Comparison Example B except that cesium hydroxide replaces potassium hydroxide as the catalyst on a mole-to-mole basis. The product has a hydroxyl number identical to that of the polyether of Comparison Example B, but an aqueous gel is produced at only 16 percent solids, an improvement of 20 percent.

The embodiments of the invention in which an exclusive property or privilege is claimed are defined as follows:

1. A process for the preparation of polyoxyalkylene block polyethers containing one or more polyoxyethylene moieties and one or more polyoxy(higher alkylene) moieties, comprising catalyzing at least the formation of said polyoxyethylene moiety from ethylene oxide with a basic cesium-containing catalyst.

2. The process of claim 1 wherein said basic cesium-containing catalyst comprises cesium hydroxide.

3. The process of claim 2 wherein said polyoxy(higher alkylene) moiety is derived from oxyalkylation with an alkylene oxide selected from the group consisting of propylene oxide and butylene oxide.

4. The process of claim 2 wherein said polyoxy(higher alkylene) moiety is derived from a cyclic ether from the group consisting of oxetane and tetrahydrofuran.

5. The process of claim 2 wherein said cesium hydroxide-containing catalyst comprises cesium hydroxide and potassium hydroxide in a molar ratio greater than 1:3.

6. The process of claim 3 wherein said cesium hydroxide-containing catalyst comprises cesium hydroxide and potassium hydroxide in a molar ratio greater than 1:3.

7. The process of claim 4 wherein said cesium hydroxide-containing catalyst comprises cesium hydroxide and potassium hydroxide in a molar ratio greater than 1:3.

8. The process of claim 2 wherein said cesium hydroxide-containing catalyst consists essentially of cesium hydroxide.

9. The process of claim 3 wherein said cesium hydroxide-containing catalyst consists essentially of cesium hydroxide.

10. The process of claim 4 wherein said cesium hydroxide-containing catalyst consists essentially of cesium hydroxide.

11. The process of claim 1 wherein said cesium-containing catalyst comprises a basic cesium compound selected from the group consisting of cesium oxide, cesium carbonate, cesium acetate, and the cesium alkoxides of $C_1$-$C_8$ lower alkanols.

12. The process of claim 11 wherein both ethylene oxide addition and higher alkylene oxide addition is catalyzed by said catalyst containing a basic cesium compound.

13. A process for the preparation of polyoxyalkylene block polyethers containing one or more polyoxyethylene moieties and one or more polyoxy(higher alkylene) moieties by sequential oxyalkylation with ethylene oxide and one or more higher alkylene oxides, comprising catalyzing all oxyalkylations with a cesium hydroxide-containing catalyst.

14. The process of claim 13 wherein said polyoxy(higher alkylene) moiety is derived from oxyalkylation with an alkylene oxide selected from the group consisting of propylene oxide and butylene oxide.

15. The process of claim 13 wherein said cesium hydroxide-containing catalyst comprises cesium hydroxide and potassium hydroxide in a molar ratio greater than 1:3.

16. The process of claim 14 wherein said cesium hydroxide-containing catalyst comprises cesium hydroxide and potassium hydroxide in a molar ratio greater than 1:3.

17. The process of claim 13 wherein said cesium hydroxide-containing catalyst consists essentially of cesium hydroxide.

18. The process of claim 3 wherein said cesium hydroxide-containing catalyst contains cesium hydroxide and sodium hydroxide in a molar ratio greater than 1:3.

19. The process of claim 13 wherein said cesium hydroxide-containing catalyst contains cesium hydroxide and sodium hydroxide in a molar ratio greater than 1:3.

* * * * *